US012136812B2

(12) United States Patent
Fujisaki

(10) Patent No.: US 12,136,812 B2
(45) Date of Patent: Nov. 5, 2024

(54) POWER SUPPLY APPARATUS AND CONTROL METHOD

(71) Applicant: CANON KABUSHIKI KAISHA, Tokyo (JP)

(72) Inventor: Tsuyoshi Fujisaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 351 days.

(21) Appl. No.: 17/496,943

(22) Filed: Oct. 8, 2021

(65) Prior Publication Data

US 2022/0115866 A1 Apr. 14, 2022

(30) Foreign Application Priority Data

Oct. 12, 2020 (JP) .................................. 2020-171963

(51) Int. Cl.
*H02J 7/00* (2006.01)
*H02J 1/08* (2006.01)

(52) U.S. Cl.
CPC .......... *H02J 1/082* (2020.01); *H02J 7/00034* (2020.01); *H02J 7/00045* (2020.01); *H02J 2207/30* (2020.01)

(58) Field of Classification Search
CPC .... H02J 1/082; H02J 7/00034; H02J 7/00045; H02J 2207/30
See application file for complete search history.

(56) References Cited

U.S. PATENT DOCUMENTS

| 2010/0264746 | A1* | 10/2010 | Kazama | H02J 50/80 |
| | | | | 307/104 |
| 2018/0062381 | A1* | 3/2018 | Järvensivu | H01R 13/6683 |
| 2018/0166886 | A1* | 6/2018 | Ueta | G06F 1/266 |
| 2019/0212795 | A1* | 7/2019 | Moritomo | G06F 1/26 |
| 2019/0312462 | A1* | 10/2019 | Shichino | H02J 50/80 |
| 2019/0324511 | A1* | 10/2019 | Cao | G06F 1/28 |
| 2021/0306501 | A1* | 9/2021 | Hayashi | H04N 1/00907 |
| 2021/0349511 | A1* | 11/2021 | Moritomo | G06F 13/4282 |
| 2021/0376643 | A1* | 12/2021 | Paparrizos | H02J 7/02 |
| 2022/0037905 | A1* | 2/2022 | Kitanosako | G06F 1/266 |

FOREIGN PATENT DOCUMENTS

| JP | 2001243707 A | 9/2001 |
| JP | 2017038429 A | 2/2017 |
| JP | 2018-097643 A | 6/2018 |
| JP | 2019087089 A | 6/2019 |

OTHER PUBLICATIONS

The above foreign patent documents were cited in the Jun. 4, 2024 Japanese Office Action, which is enclosed without an English Translation, that issued in Japanese Patent Application No. 2020-171963.

* cited by examiner

*Primary Examiner* — Aftab N. Khan
(74) *Attorney, Agent, or Firm* — Cowan, Liebowitz & Latman, P.C.

(57) ABSTRACT

A power supply apparatus includes a communication unit and a control unit. The control unit controls the communication unit so as to perform authentication communication with a cable after the cable is connected to the power supply apparatus, and controls the communication unit so as not to accept a request from an external apparatus connected to the cable in a period until the authentication communication is completed.

15 Claims, 7 Drawing Sheets

FIG. 7A

| VOLTAGE | 5V | 9V | 12V | 15V | 20V |
|---|---|---|---|---|---|
| CURRENT | 5A | 5A | 5A | 4A | 3A |
| POWER | 25W | 45W | 60W | 60W | 60W |

FIG. 7B

| VOLTAGE | 20V |
|---|---|
| CURRENT | 3A |
| POWER | 60W |

FIG. 7C

| VOLTAGE | 5V | 9V | 12V | 15V | 20V |
|---|---|---|---|---|---|
| CURRENT | 3A | 3A | 3A | 3A | 3A |
| POWER | 15W | 27W | 36W | 45W | 60W |

FIG. 7D

| VOLTAGE | 5V | 9V |
|---|---|---|
| CURRENT | 2A | 1.1A |
| POWER | 10W | 9.9W |

POWER SUPPLY APPARATUS AND CONTROL METHOD

BACKGROUND

Field of the Disclosure

Aspects of the disclosure generally relate to a power supply apparatus, and a method for controlling the power supply apparatus.

Description of the Related Art

Japanese Patent Application Publication No. 2018-97643 describes a power supply apparatus that restricts power to be supplied to an external device when authentication communication with a USB (Universal Serial Bus) cable having a cable authentication chip has failed.

However, when the power supply apparatus described in Japanese Patent Application Publication No. 2018-97643 receives a request from the external device while performing authentication communication with a cable, the power supply apparatus stops the authentication communication and transmits a response to the request, and this prolongs the time needed for the authentication communication.

SUMMARY

According to various embodiments, there is provided a power supply apparatus that can shorten the time needed for authentication communication.

According to various embodiments, there is provided a power supply apparatus comprising: a communication unit; and a control unit that controls the communication unit so as to perform authentication communication with a cable after the cable is connected to the power supply apparatus, and controls the communication unit so as not to accept a request from an external apparatus connected to the cable in a period until the authentication communication is completed.

According to various embodiments, there is provided a method comprising: controlling a communication unit of a power supply apparatus so as to perform authentication communication with a cable after the cable is connected to the power supply apparatus; and controlling the communication unit so as not to accept a request from an external apparatus connected to the cable in a period until the authentication communication is completed.

Further aspects of the disclosure will become apparent from the following description of exemplary embodiments.

BRIEF DESCRIPTION OF THE DRAWINGS

FIG. 7A is a diagram for describing an example of power that can be supplied. from the power supply apparatus 300 to the electronic apparatus 100.

FIG. 7B is a diagram for describing an example of characteristics of the cable 200.

FIG. 7C is a diagram for describing an example of a first power supply capability.

FIG. 7D is a diagram for describing an example of a second power supply capability.

DESCRIPTION OF THE EMBODIMENTS

Exemplary embodiments, features, and aspects of the disclosure will be described below with reference to the drawings. However, aspects of the disclosure are not limited to the following embodiments.

Figure 1:
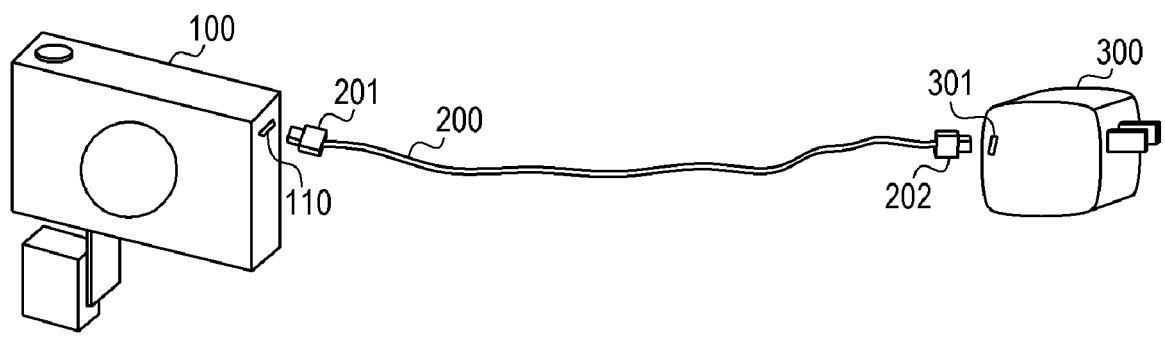
FIG. 1 is a diagram for illustrating components of a power supply system according to a first embodiment.

[First Embodiment] FIG. 1 is a diagram for illustrating components of a power supply system according to a first embodiment. The power supply system illustrated in FIG. 1 includes an electronic apparatus 100, a cable 200, and a power supply apparatus 300.

The electronic apparatus 100 is an electronic apparatus capable of receiving power from the power supply apparatus 300. In an example in FIG. 1, the electronic apparatus 100 is a digital camera. The electronic apparatus 100 includes a device connector 110 for connecting the electronic apparatus 100 to the power supply apparatus 300. The device connector 110 is, for example, a receptacle conforming to the USB (Universal Serial Bus) Type-C standard. The electronic apparatus 100 is not limited to a digital camera and may be, for example, an information processing apparatus such as a personal computer, a smartphone, or a tablet terminal.

The cable 200 is a cable that can transmit information, power, or the like. The cable 200 has a cable connector 201 on one end of the cable 200 and a cable connector 202 on the other end of the cable 200. For example, the cable 200 is a USB cable, and each of the cable connector 201 and the cable connector 202 is a plug conforming to the USB Type-C standard.

The power supply apparatus 300 is a power supply apparatus that can supply power to the electronic apparatus 100, which is an external apparatus. In the example in FIG. 1, the power supply apparatus 300 is an AC (alternating current) adapter that uses an AC power source. The power supply apparatus 300 includes a source connector 301 for connecting the power supply apparatus 300 to the electronic apparatus 100. The source connector 301 is, for example, a receptacle conforming to the USB Type-C standard. The power supply apparatus 300 is not limited to an AC adapter, For example, the power supply apparatus 300 may be an information processing apparatus such as a personal computer or may be a mobile battery or the like.

For example, the cable connector 201 is connected to the device connector 110, and the cable connector 202 is connected to the source connector 301. In this way, the power supply apparatus 300 can supply power from the source connector 301 to the electronic apparatus 100 via the cable 200. Alternatively, the cable connector 202 may be connected to the device connector 110, and the cable connector 201 may be connected to the source connector 301.

Figure 2:
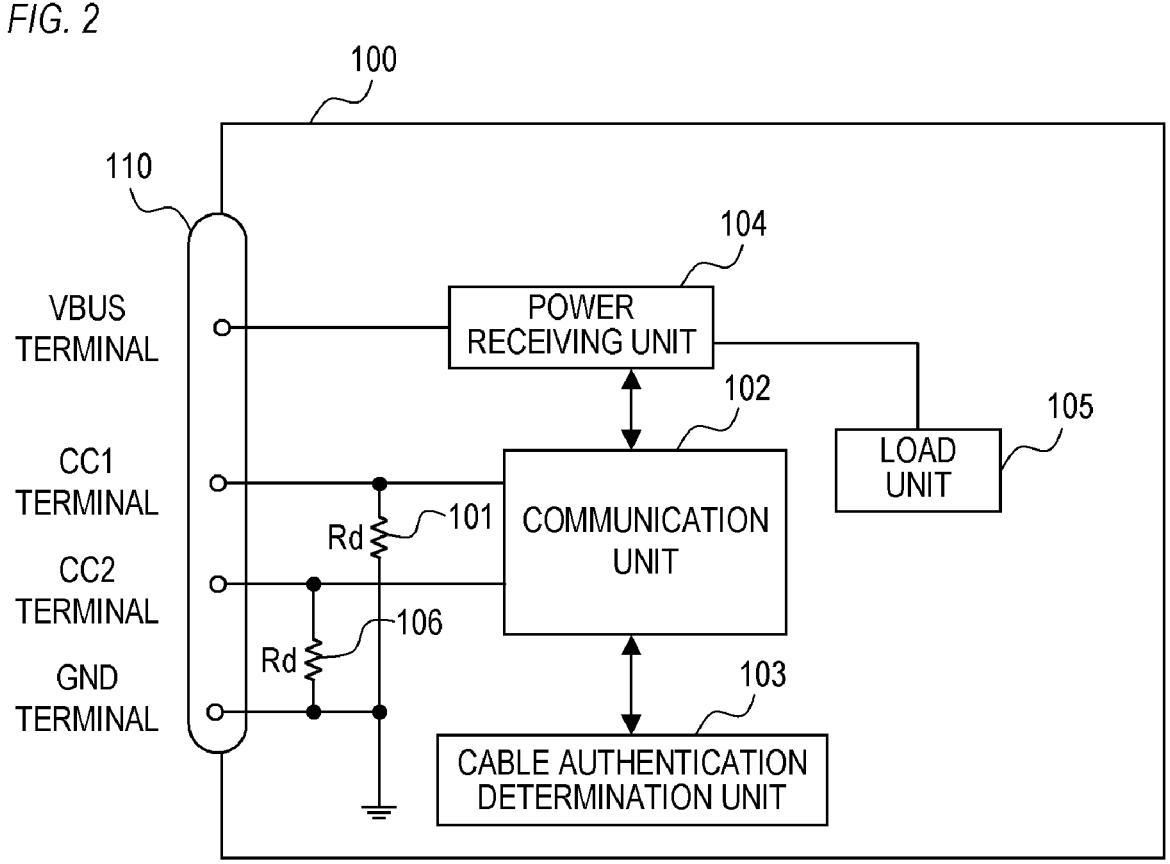
FIG. 2 is a block diagram for illustrating components of an electronic apparatus 100.
Figure 5A:
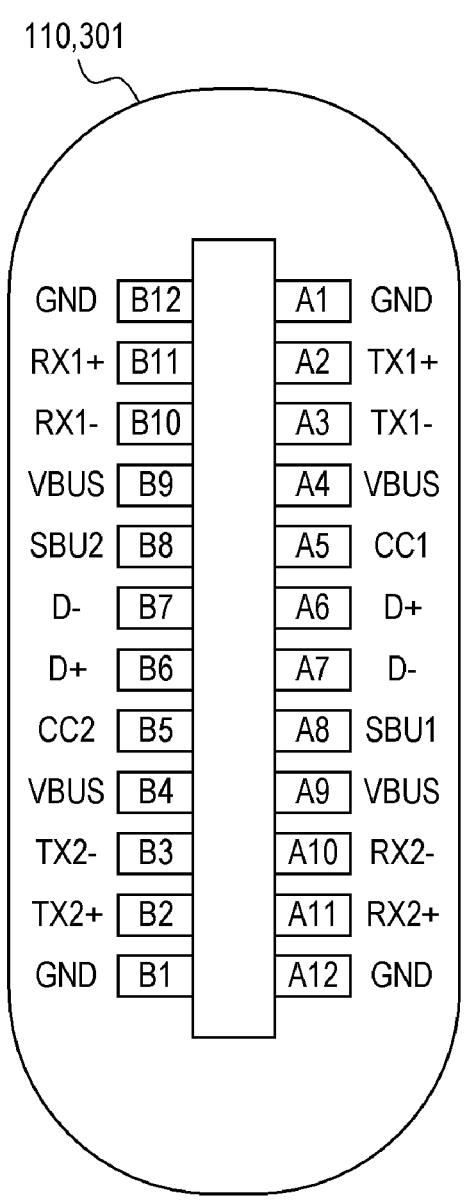
FIG. 5A is a diagram for illustrating a device connector 110 and a source connector 301.

FIG. 2 is a block diagram for illustrating components of the electronic apparatus 100. FIG. 5A is a diagram for illustrating the device connector 110.

As illustrated in FIG. 5A, the device connector 110 has terminals including a VBUS terminal, a CC1 terminal, a CC2 terminal, a GND terminal, or the like. For example, in the device connector 110, the VBUS terminal is a terminal for receiving power. The CC1 terminal and the CC2 terminal are terminals for acquiring information about the power supply apparatus 300. The GND terminal is a terminal for determining a reference of a signal.

A pull-down resistor 101 (Rd) conforming to the USB Type-C standard is connected between the CC1 terminal of the device connector 110 and the GND terminal of the device connector 110. A pull-down resistor 106 (Rd) conforming to the USB Type-C standard is connected between the CC2 terminal of the device connector 110 and the GND terminal of the device connector 110. The pull-down resistors 101 (Rd) and 106 (Rd) are used for determining, for example, whether the power supply apparatus 300 is connected to the electronic apparatus 100 and for determining a voltage supplied from the power supply apparatus 300 to the electronic apparatus 100.

A communication unit 102 is connected to the CC1 terminal and the CC2 terminal of the device connector 110 and performs communication with the cable 200 or the power supply apparatus 300 via the CC1 terminal and the CC2 terminal. For example, the communication unit 102 performs communication based on the USB PD (Power Delivery) standard with the power supply apparatus 300 and determines whether the power supply apparatus 300 is conformed to the USB PD standard. If the power supply apparatus 300 is conformed to the USB PD standard, the communication unit 102 performs negotiation communication conforming to the USB PD standard with the power supply apparatus 300 so as to request the power supply apparatus 300 to supply desired power. Furthermore, the communication unit 102 performs authentication communication conforming to the USB Type-C AUTH (Authentication) standard with the cable 200.

A cable authentication determination unit 103 determines whether the cable 200 is conformed to the USB PD standard based on a result of the authentication communication by the communication unit 102.

A power receiving unit 104 is connected to the VBUS terminal of the device connector 110 and supplies power supplied from the power supply apparatus 300 via the cable 200 to the components of the electronic apparatus 100. The power receiving unit 104 controls the power supplied from the power supply apparatus 300 based on the result of the communication performed by the communication unit 102.

A load unit 105 is configured by various modules that operate by consuming the power supplied from the power receiving unit 104. For example, when the electronic apparatus 100 is a digital camera, the load unit 105 includes an imaging lens, an imaging element, a display unit, a user interface unit, or the like. For example, the imaging lens changes zoom magnification on an object image and adjusts the focus on an object image. The imaging element is an image sensor configured by, for example, a CCD (charge coupled device) or a CMOS (complementary metal oxide semiconductor), and converts an object image into electrical image information. A display unit is, for example, an LCD (liquid crystal display) and displays acquired image information or the like. The user interface unit includes a switch or the like and receives an instruction from the user to the electronic apparatus 100. Power consumed by the load unit 105 varies depending on the operational state of the electronic apparatus 100.

Figure 3:
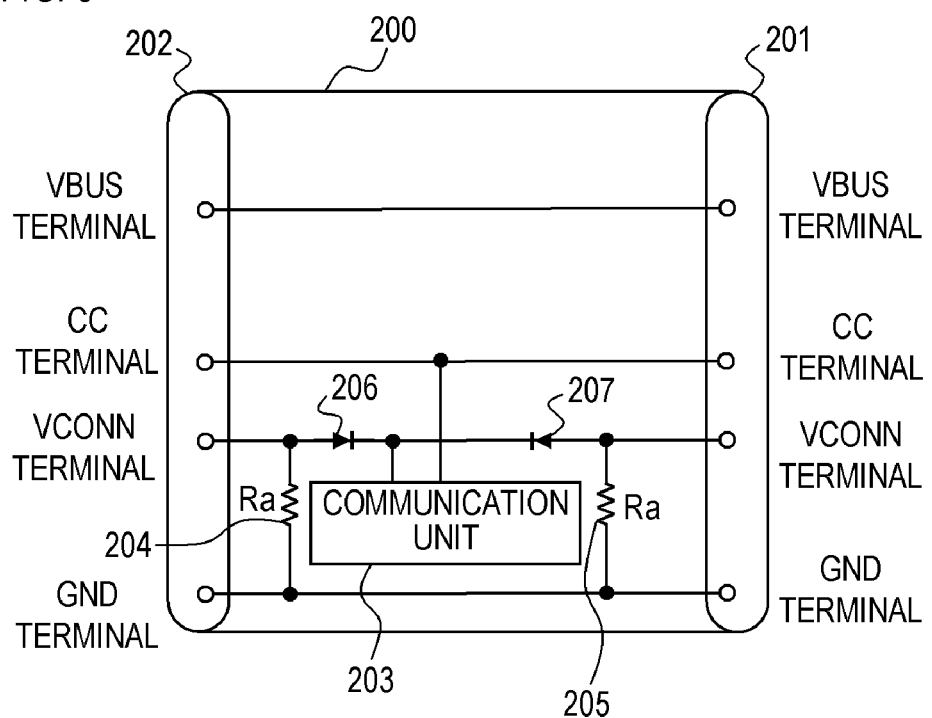
FIG. 3 is a block diagram for illustrating components of a cable 200.
Figure 5B:
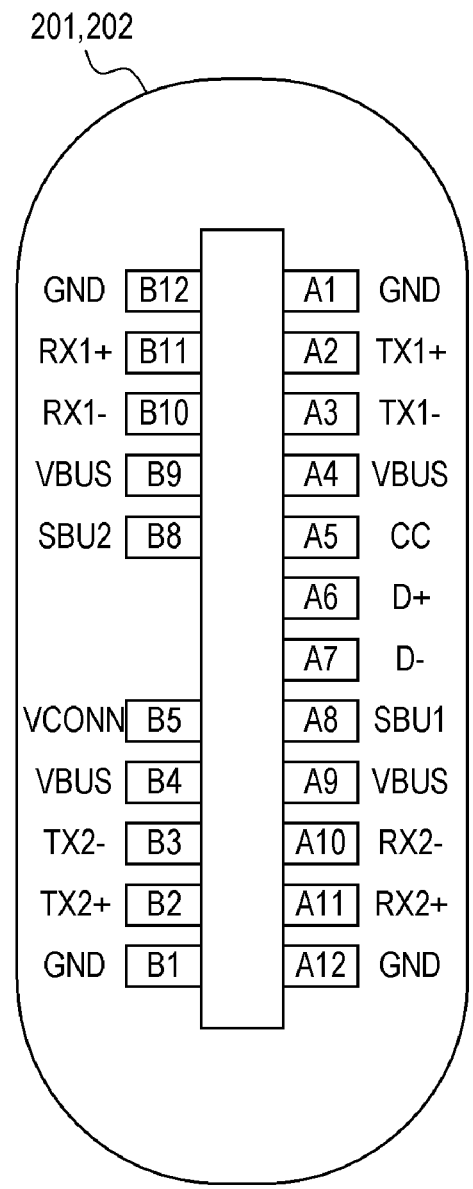
FIG. 5B is a diagram for illustrating cable connectors 201 and 202.

FIG. 3 is a block diagram for illustrating components of the cable 200. FIG. 5B is a diagram for illustrating the cable connectors 201 and 202.

The cable connector 201 and the cable connector 202 each have terminals (pins) including a VBUS terminal, a CC terminal, a VCONN terminal, and a GND terminal as illustrated in FIG. 5B. For example, in each of the cable connector 201 and the cable connector 202, the VBUS terminal is a terminal for transmitting power, and the CC terminal is a terminal for transmitting various kinds of information such as information about the power supply apparatus 300. The VCONN terminal is a terminal for supplying power to a communication unit 203, and the GND terminal is a terminal for determining a reference of a signal.

The communication unit 203 is connected to the CC terminal of the cable connector 201, the VCONN terminal of the cable connector 201, the CC terminal of the cable connector 202, and the VCONN terminal of the cable connector 202. The communication unit 203 uses these terminals to perform communication with the electronic apparatus 100 or the power supply apparatus 300. For example, the communication unit 203 performs negotiation communication conforming to the USB PD standard with at least one of the electronic apparatus 100 and the power supply apparatus 300. Through this negotiation communication, the communication unit 203 transmits characteristic information indicating the characteristics of the cable 200 to at least one of the electronic apparatus 100 and the power supply apparatus 300. FIG. 7B is a diagram for describing an example of the characteristics of the cable 200 and indicates an upper limit (for example, 20 V) of a voltage allowed by the cable 200 and an upper limit (for example, 3 A) of a current allowed by the cable 200. The above-described characteristic information is, for example, information indicating the characteristics in FIG. 7B. Each of the electronic apparatus 100 and the power supply apparatus 300 performs authentication communication conforming to the USB Type-C AUTH standard with the communication unit 203 and determines whether the cable 200 is conformed to the USB PD standard.

A pull-down resistor 204 (Ra) conforming to the USB Type-C standard is connected between the VCONN terminal of the cable connector 202 and the GND terminal of the cable connector 202. A pull-down resistor 205 (Ra) conforming to the USB Type-C standard is connected between the VCONN terminal of the cable connector 201 and the GND terminal of the cable connector 201. The pull-down resistors 204 (Ra) and 205 (Ra) are used for determining, for example, whether the cable 200 is connected to the power supply apparatus 300.

A backflow prevention diode 206 is a diode for preventing power supplied from the VCONN terminal of the cable connector 201 from being supplied to the VCONN terminal of the cable connector 202. A backflow prevention diode 207 is a diode for preventing power supplied from the VCONN terminal of the cable connector 202 from being supplied to the VCONN terminal of the cable connector 201.

Figure 4:
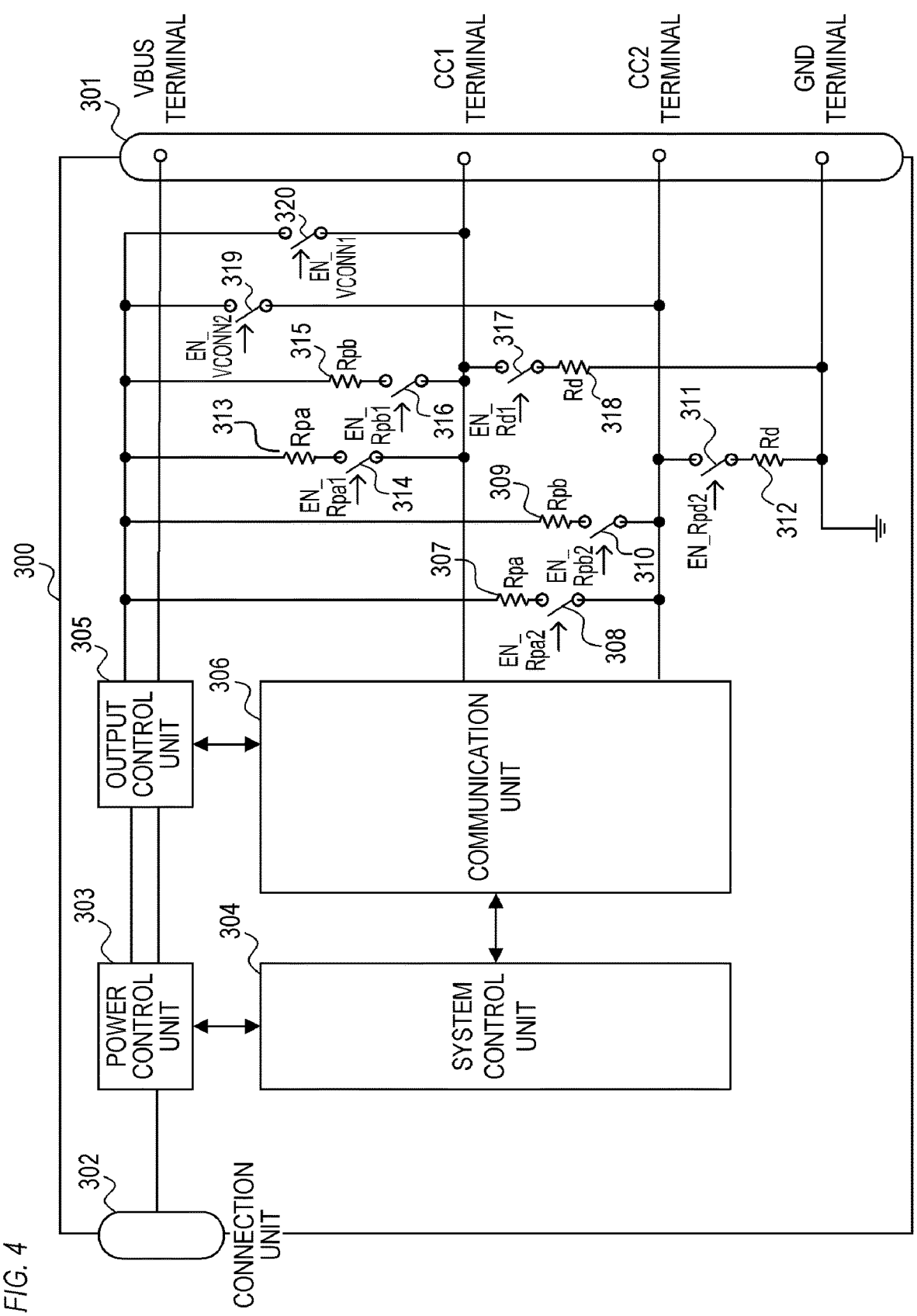
FIG. 4 is a block diagram for illustrating components of a power supply apparatus 300.

FIG. 4 is a block diagram for illustrating components of the power supply apparatus 300. FIG. 5A is a diagram for illustrating the source connector 301.

As illustrated in FIG. 5A, the source connector 301 has terminals (pins: interfaces) including a VBUS terminal, a CC1 terminal, a CC2 terminal, a GND terminal, or the like. For example, in the source connector 301, the VBUS terminal is a terminal for receiving power. The CC1 terminal and the CC2 terminal are terminals for outputting information about the power supply apparatus 300. The GND terminal is a terminal for determining a reference of a signal. When connected to the VCONN terminal of the cable 200, each of the CC1 terminal and the CC2 terminal can supply power to the VCONN terminal.

A connection unit 302 is connected to an external power source such as an AC power source or a battery and acquires power from the external power source.

A power control unit 303 converts power acquired from the connection unit 302 into power that can be supplied from the power supply apparatus 300 to the electronic apparatus 100. The power that can be supplied from the power supply apparatus 300 to the electronic apparatus 100 varies depending on the external power source to which the connection unit 302 is connected. Here, a case in which the connection unit 302 is connected to an AC power source (for example, an AC power source of 100 V and 50 Hz) such as a household electrical outlet and the power supply apparatus 300 supplies a current of 3 A at a DC (direct current) voltage of 9 V to the electronic apparatus 100 will be considered. In this case, the power control unit 303 performs AC/DC conversion on the power acquired from the connection unit 302 so that the power with a DC voltage of 9 V and a current of 3 A can be supplied to the electronic apparatus 100. The power control unit 303 also generates power supplied form the power supply apparatus 300 to the VCONN terminal of the cable 200.

A system control unit 304 controls the components of the power supply apparatus 300. For example, based on a result of the authentication communication performed by a communication unit 306, the system control unit 304 selects a first power supply capability or a second power supply capability to notify the electronic apparatus 100 of at least one type of power that can be supplied from the power supply apparatus 300 to the electronic apparatus 100. FIG. 7A is a diagram for describing an example of power that can be supplied from the power supply apparatus 300 to the electronic apparatus 100. The system control unit 304 controls power supplied from the power supply apparatus 300 to the electronic apparatus 100 by controlling the power control unit 303 based on a result of the communication performed by the communication unit 306.

An output control unit 305 is connected to the power control unit 303 and the VBUS terminal of the source connector 301. The output control unit 305 can supply power supplied from the power control unit 303 to the electronic apparatus 100 via the VBUS terminal of the source connector 301 and the cable 200. The output control unit 305 can also stop supplying the power to the electronic apparatus 100. For example, the system control unit 304 controls timing of the power supply by the output control unit 305 by controlling the output control unit 305 via the communication unit 306. The system control unit 304 stops the power supply by the output control unit 305 by controlling the output control unit 305 in response to reception of a power supply stop command from the electronic apparatus 100. The output control unit 305 is also connected to a switch 319 and a switch 320 and can supply power to be supplied to the VCONN terminal of the cable 200 to at least one of the switch 319 and the switch 320. The output control unit 305 can also stop supplying power to the switch 319 or stop supplying power to the switch 320.

The communication unit 306 is connected to the CC1 terminal and the CC2 terminal of the source connector 301 and performs communication with the cable 200 or the electronic apparatus 100 via the CC1 terminal and the CC2 terminal. For example, the communication unit 306 performs communication conforming to the USB PD standard with the electronic apparatus 100 and determines whether the electronic apparatus 100 is conformed to the USB PD standard. The communication unit 306 performs communication conforming to the USB PD standard with the cable 200 and determines whether the cable 200 is conformed to the USB PD standard.

If the electronic apparatus 100 is conformed to the USB PD standard, the communication unit 306 performs negotiation communication conforming to the USB PD standard with the electronic apparatus 100. Through this negotiation communication, the communication unit 306 transmits power supply capability information indicating a first power supply capability or a second power supply capability to the electronic apparatus 100 so as to notify the electronic apparatus 100 of at least one type of power that can be supplied from the power supply apparatus 300 to the electronic apparatus 100. Furthermore, the communication unit 306 performs authentication communication conforming to the USB Type-C AUTH standard with the electronic apparatus 100. Based on this authentication communication, the communication unit 306 notifies the electronic apparatus 100 that the power supply apparatus 300 is conformed to the USB PD standard.

If the cable 200 is conformed to the USB PD standard, the communication unit 306 performs negotiation communication conforming to the USB PD standard with the communication unit 203 of the cable 200 and acquires the characteristic information about the cable 200. Furthermore, the communication unit 306 performs authentication communication conforming to the USB Type-C AUTH with the cable 200. Next, based on the result of the authentication communication with the cable 200, the system control unit 304 determines whether the cable 200 is conformed to the USB PD standard.

A pull-up resistor 307 (Rpa) is connected between the output control unit 305 and a switch 308. The pull-up resistor 307 (Rpa) is a resistor conforming to the USB Type-C standard and has, for example, a resistance value indicating that power of 3 A can be supplied.

The switch 308 is connected between the pull-up resistor 307 (Rpa) and the CC2 terminal of the source connector 301. The system control unit 304 can switch the state of the switch 308 between a conductive state and a non-conductive state by using a control signal EN_Rpa 2. When the state of the switch 308 is in the conductive state, the pull-up resistor 307 (Rpa) is enabled.

A pull-up resistor 309 (Rpb) is connected between the output control unit 305 and a switch 310. The pull-up resistor 309 (Rpb) is a resistor conforming to the USB Type-C standard and has, for example, a resistance value indicating that power of 1.5 A can be supplied.

The switch 310 is connected between the pull-up resistor 309 (Rpb) and the CC2 terminal of the source connector 301. The system control unit 304 can switch the state of the switch 310 between a conductive state and a non-conductive state by using a control signal EN_Rpb 2. When the state of the switch 310 is in the conductive state, the pull-up resistor 309 (Rpb) is enabled.

A switch 311 is connected between the CC2 terminal of the source connector 301 and a pull-down resistor 312 (Rd). The system control unit 304 can switch the state of the switch 311 between a conductive state and a non-conductive state by using a control signal EN_Rpd 2. When the state of the switch 311 is in the conductive state, the pull-down resistor 312 (Rd) is enabled.

The pull-down resistor 312 (Rd) is connected between the switch 311 and the GND terminal of the source connector 301.

A pull-up resistor 313 (Rpa) is connected between the output control unit 305 and a switch 314. The pull-up resistor 313 (Rpa) is a resistor conforming to the USB Type-C standard and has, for example, a resistance value indicating that power of 3 A can be supplied.

The switch 314 is connected between the pull-up resistor 313 (Rpa) and the CC1 terminal of the source connector 301. The system control unit 304 can switch the state of the switch 314 between a conductive state and a non-conductive state by using a control signal EN_Rpa 1. When the state of the switch 314 is in the conductive state, the pull-up resistor 313 (Rpa) is enabled.

A pull-up resistor 315 (Rpb) is connected between the output control unit 305 and a switch 316. The pull-up resistor 315 (Rpb) is a resistor conforming to the USB Type-C standard and has, for example, a resistance value indicating that power of 1.5 A can be supplied.

The switch 316 is connected between the pull-up resistor 315 (Rpb) and the CC1 terminal of the source connector 301. The system control unit 304 can switch the state of the switch 316 between a conductive state and a non-conductive state by using a control signal EN_Rpb 1. When the state of the switch 316 is in the conductive state, the pull-up resistor 315 (Rpb) is enabled.

A switch 317 is connected between the CC1 terminal of the source connector 301 and a pull-down resistor 318 (Rd). The system control unit 304 can switch the state of the switch 317 between a conductive state and a non-conductive state by using a control signal EN_Rd 1. When the state of the switch 317 is in the conductive state, the pull-down resistor 318 (Rd) is enabled.

The pull-down resistor 318 (Rd) is connected between the switch 317 and the GND terminal of the source connector 301.

A switch 319 is connected between the output control unit 305 and the CC2 terminal of the source connector 301. The system control unit 304 can switch the state of the switch 319 between a conductive state and a non-conductive state by using a control signal EN_VCONN 2. When the VCONN terminal of the cable 200 is connected to the CC2 terminal of the source connector 301, power generated by the power control unit 303 is supplied to the VCONN terminal of the cable 200 by bringing the switch 319 into a conductive state.

A switch 320 is connected between the output control unit 305 and the CC1 terminal of the source connector 301. The system control unit 304 can switch the state of the switch 320 between a conductive state and a non-conductive state by using a control signal EN_VCONN 1. When the VCONN terminal of the cable 200 is connected to the CC1 terminal of the source connector 301, power generated by the power control unit 303 is supplied to the VCONN terminal of the cable 200 by bringing the switch 320 into a conductive state.

The system control unit 304 can control the switches 308, 310, 311, 314, 316, and 317 so that the power supply apparatus 300 operates as a DRP (dual role port) conforming to the USB PD standard. For example, the system control unit 304 controls the switches 308, 311, 314, and 317 so as to enable any one of the pull-up resistor 307 (Rpa), the pull-down resistor 312 (Rd), the pull-up resistor 313 (Rpa), and the pull-down resistor 318 (Rd) at predetermined intervals. When the power supply apparatus 300 is connected to the electronic apparatus 100 while the pull-up resistor 307 (Rpa) or 313 (Rpa) is in an enabled state, the power supply apparatus 300 operates as a source conforming to the USB PD standard. When the power supply apparatus 300 is connected to the electronic apparatus 100 while the pull-down resistor 312 (Rd) or 318 (Rd) is in then enabled state, power supply apparatus 300 operates as a sink conforming to the USB PD standard. By causing the power supply apparatus 300 to operate as a source or a sink, even when the electronic apparatus 100 operates as a source, a sink, or a DRP, the system control unit 304 can detect the connection between the electronic apparatus 100 and the power supply apparatus 300. Thus, the system control unit 304 can perform communication with the electronic apparatus 100 by controlling the communication unit 306. The system control unit 304 can control the switches 308, 310, 311, 314, 316, 317, 319, and 320 by controlling the communication unit 306.

Figure 6:
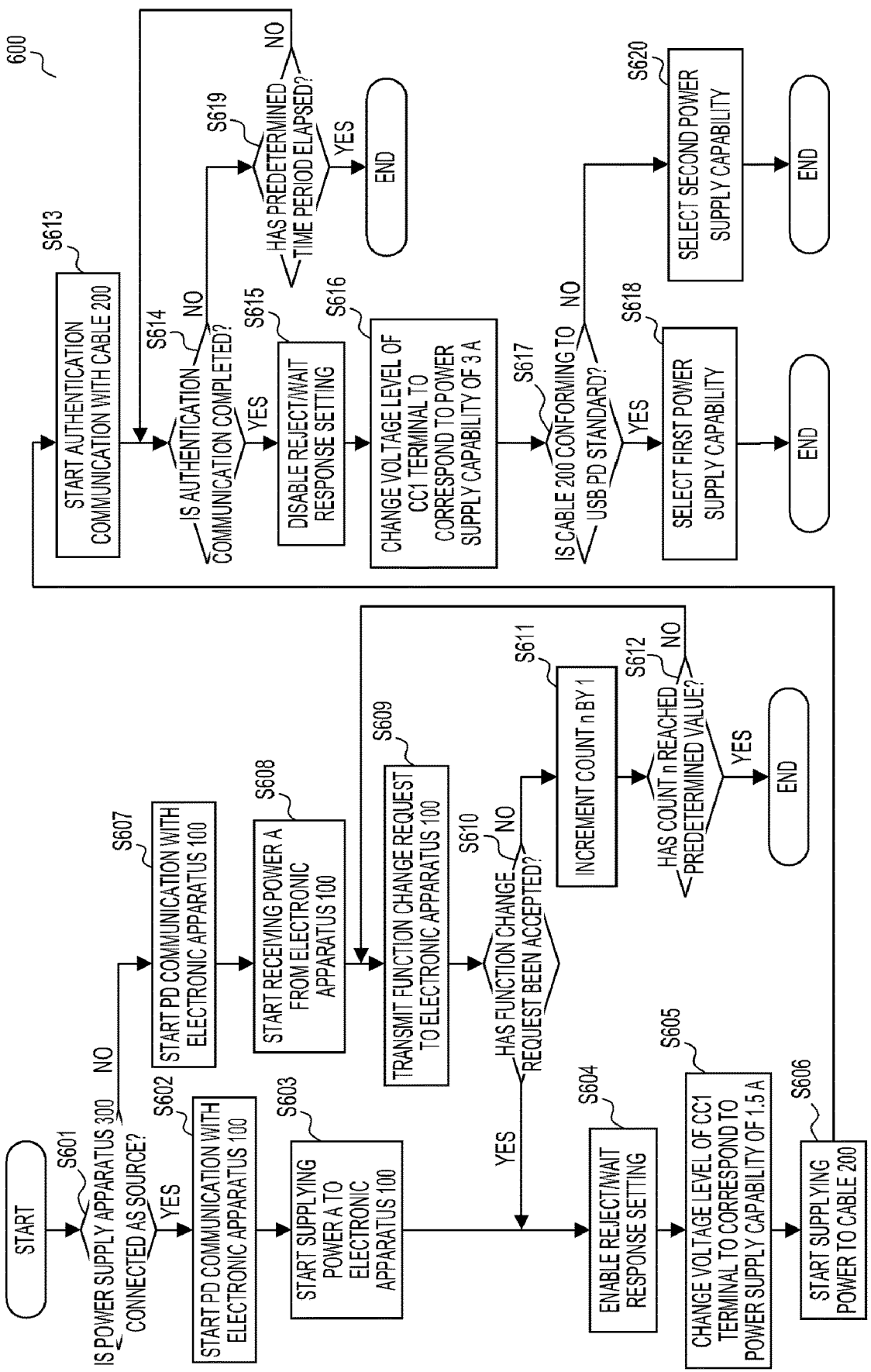
FIG. 6 is a flowchart for illustrating an example of a process 600 performed by the power supply apparatus 300.

FIG. 6 is a flowchart for illustrating an example of a process 600 performed by the power supply apparatus 300. In the first embodiment, the power supply apparatus 300 is assumed to be connected to the electronic apparatus 100 via the cable 200.

In step S601, the system control unit 304 determines whether the power supply apparatus 300 is connected as a source by an operation as the DRP. For example, when connection between the electronic apparatus 100 and the power supply apparatus 300 is detected while the switch 308 or 314 is in a conductive state, the system control unit 304 determines that the power supply apparatus 300 is connected as a source. When connection between the electronic apparatus 100 and the power supply apparatus 300 is detected while the switch 311 or 317 is in a conductive state, the system control unit 304 determines that the power supply apparatus 300 is connected as a sink. For example, the connection between the electronic apparatus 100 and the power supply apparatus 300 can be detected from a voltage level of the CC1 terminal of the source connector 301, a voltage level of the CC2 terminal of the source connector 301, or the like. If the system control unit 304 determines that the power supply apparatus 300 is connected as a source, the system control unit 304 proceeds to step S602, and if the system control unit 304 determines that the power supply apparatus 300 is connected as a sink, the system control unit 304 proceeds to step S607.

In step S602, the system control unit 304 controls the communication unit 306 to start PD communication with the electronic apparatus 100. The PD communication is communication conforming to the USB PD standard. In the first embodiment, a case in which the electronic apparatus 100 operates as a sink and the power supply apparatus 300 operates as a source will be described. Furthermore, in the first embodiment, a case in which the CC terminal of the cable 200 is connected to the CC1 terminal of the source connector 301, and the VCONN terminal of the cable 200 is connected to the CC2 terminal of the source connector 301 will be described. After the PD communication has been started, the system control unit 304 proceeds to step S603.

In step S603, the system control unit 304 controls the power control unit 303 and the output control unit 305 to start supplying power A to the electronic apparatus 100. For example, the power A is default USB power (5 V, 900 mA) conforming to the USB 3.1 standard, default USB power (5 V, 500 mA) conforming to the USB 2.0 standard, or the like. After the supply of the power A to the electronic apparatus 100 has started, the system control unit 304 proceeds to step S604.

In steps S604 and S605, the system control unit 304 controls the communication unit 306 not to receive a request (for example, a request to start authentication communication) from the electronic apparatus 100. Alternatively, the process of either step S604 or step S605 may be omitted.

In step S604, the system control unit 304 controls the communication unit 306 to enable a reject/wait response setting of the communication unit 306. The reject/wait response setting is a setting that returns a response indicating a rejection of a request or a response instructing standby as a response to a request from the electronic apparatus 100. For example, the reject/wait response setting is a setting that returns a reject message or a wait message as a response to a VCONN_Swap message or a Try.SRC message conforming to the USB PD standard. The VCONN_Swap message and the Try.SRC message are messages for causing the power supply apparatus 300 to operate as a source or a sink. The reject message is a message indicating a rejection, and the wait message is a message instructing standby. After the reject/wait response setting of the communication unit 306 has been enabled, the system control unit 304 proceeds to step S605.

In step S605, the system control unit 304 controls the communication unit 306 to switch the state of the switch 314 to a non-conductive state and switch the state of the switch 316 to a conductive state. This enables the pull-up resistor 315 (Rpb), and consequently, the voltage level of the CC1 terminal of the source connector 301 is changed from a voltage level corresponding to a power supply capability of 3 A to a voltage level corresponding to a power supply capability of 1.5 A. In the first embodiment, the voltage level of the CC1 terminal is used for controlling the communication between the power supply apparatus 300 and the electronic apparatus 100 and indicates whether the communication from the electronic apparatus 100 to the power supply apparatus 300 is restricted. When the voltage level of the CC1 terminal is a voltage level corresponding to a power supply capability of 1.5 A, the communication from the power supply apparatus 300 to the electronic apparatus 100 is allowed, and the communication from the electronic apparatus 100 to the power supply apparatus 300 is restricted. When the voltage level of the CC1 terminal is a voltage level corresponding to a power supply capability of 3 A, the communication from the power supply apparatus 300 to the electronic apparatus 100 is restricted, and the communication from the electronic apparatus 100 to the power supply apparatus 300 is allowed. In step S605, since the voltage level of the CC1 terminal is changed to the voltage level indicating that the communication from the electronic apparatus 100 to the power supply apparatus 300 is restricted, the communication from the electronic apparatus 100 to the power supply apparatus 300 is restricted. After the communication from the electronic apparatus 100 to the power supply apparatus 300 is restricted, the system control unit 304 proceeds to step S606.

In step S606, the system control unit 304 controls the communication unit 306 to switch the state of the switch 319 to a conductive state. This supplies power from the CC2 terminal of the source connector 301 to the communication unit 203 of the cable 200 via the VCONN terminal of the cable 200, which allows the communication unit 203 to operate. After the supply of the power to the VCONN terminal of the cable 200 has started, the system control unit 304 proceeds to step S613.

In step S607, the system control unit 304 controls the communication unit 306 to start PD communication with the electronic apparatus 100. In the first embodiment, the electronic apparatus 100 operates as a source, and the power supply apparatus 300 operates as a sink. After the PD communication has started, the system control unit 304 proceeds to step S608.

In step S608, the system control unit 304 receives power A from the electronic apparatus 100. After the reception of the power from the electronic apparatus 100 has started, the system control unit 304 proceeds to step S609.

In step S609, the system control unit 304 controls the communication unit 306 to transmit a function change request to the electronic apparatus 100. The function change request is, for example, a VCONN_Swap message conforming to the USB PD standard or a Try.SRC message conforming to the USB PD standard. After the function change request has been transmitted to the electronic apparatus 100, the system control unit 304 proceeds to step S610.

In step S610, the system control unit 304 determines whether the electronic apparatus 100 has accepted the function change request transmitted in step S609. For example, when the system control unit 304 receives an accept message conforming to the USB PD standard as a response to the function change request, the system control unit 304 determines that the electronic apparatus 100 has accepted the function change request. When the system control unit 304 does not receive the accept message, the system control unit 304 determines that the electronic apparatus 100 has not accepted the function change request. If the system control unit 304 determines that the electronic apparatus 100 has accepted the function change request, the system control unit 304 performs a predetermined process conforming to the USB PD standard. This enables the power supply apparatus 300 to operate as a sink or a source. Next, the system control unit 304 proceeds to step S604. If the system control unit 304 determines that the electronic apparatus 100 has not accepted the function change request, the system control unit 304 proceeds to step S611.

In step S611, the system control unit 304 increments the value of count n by 1. After the value of count a has been incremented by 1, the system control unit 304 proceeds to step S612.

In step S612, the system control unit 304 determines whether the value of count n has reached a predetermined value. The predetermined value is, for example, 3. If the system control unit 304 determines that the value of count n has reached the predetermined value, the system control unit 304 performs a time-out process. In the time-out process, the system control unit 304 switches the connection between the power supply apparatus 300 and the electronic apparatus 100 from the connection conforming to the USB PD standard to the connection conforming to the USB Type-C standard and ends the process 600 in FIG. 6. If the system control unit 304 determines that the value of count n has not reached the predetermined value, the system control unit 304 proceeds to step S609. Thus, the system control unit 304 repeats the transmission of the function change request (step S609) predetermined number of times (for example, 3 times) in a predetermined time period, and if the system control unit 304 cannot receive the accept message even after the predetermined time period has elapsed, the system control unit 304 performs the time-out process. If the system control unit 304 receives the accept message before the predetermined time period elapses, the system control unit 304 proceeds to step S604. The predetermined time period is a time period conforming to the USB PD standard, which is, for example, 195 μsec. Alternatively, after performing the process of step S609, if the system control unit 304 receives a reject message as a response to the function change request, the system control unit 304 may skip the processes of step S611 and S612 and perform the time-out process.

In step S613, the system control unit 304 controls the communication unit 306 to perform authentication communication conforming to the USB Type-C AUTH standard (USB Type-C Authentication standard) with the cable 200.

After the authentication communication with the cable 200 has started, the system control unit 304 proceeds to step S614.

In step S614, the system control unit 304 determines whether the authentication communication in step S613 has been completed (succeeded). For example, when the system control unit 304 receives predetermined authentication information based on the communication protocol of the USB Type-C AUTH standard, the system control unit 304 determines that the authentication comms nication has been completed (succeeded). When the system control unit 304 does not receive predetermined authentication information, the system control unit 304 determines that the authentication communication has not been completed (succeeded). The predetermined authentication information is, for example, information (XID or the like) unique to the apparatus. If the system control unit 304 determines that the authentication communication has been completed, the system control unit 304 proceeds to step S615, and if the system control unit 304 determines that the authentication communication has not been completed, the system control unit 304 proceeds to step S619.

In step S619, the system control unit 304 determines whether a predetermined time period has elapsed since the start of the authentication communication in step S613. The predetermined time period is a time period conforming to the USB PD standard, which is, for example, 4.5 sec. If the system control unit 304 determines that the predetermined time period has elapsed since the start of the authentication communication, the system control unit 304 determines that the authentication communication has not been completed (the authentication communication has failed) and performs the time-out process. For example, when there is a failure in the connection state between the power supply apparatus 300 and the electronic apparatus 100, the authentication communication fails. In the time-out process, the system control unit 304 switches the connection between the power supply apparatus 300 and. the electronic apparatus 100 from the connection conforming to the USB PD standard to the connection conforming to the USB Type-C standard and ends the process 600 in FIG. 6. If the system control unit 304 determines that the predetermined time period has not elapsed since the start of the authentication communication, the system control unit 304 proceeds to step S614.

In step S615, the system control unit 304 controls the communication unit 306 to disable the resist/wait response setting of the communication unit 306. After the resist/wait response setting of the communication unit 306 has been disabled, the system control unit 304 proceeds to step S616.

In step S616, the system control unit 304 controls the communication unit 306 to switch the state of the switch 314 to a conductive state and switch the state of the switch 316 to a non-conductive state. This enables the pull-up resistor 313 (Rpa). Thus, the voltage level of the CC1 terminal of the source connector 301 is changed from a voltage level corresponding to a power supply capability of 1.5 A to a voltage level corresponding to a power supply capability of 3 A. Since the voltage level of the CC1 terminal changes to the voltage level indicating that the communication from the electronic apparatus 100 to the power supply apparatus 300 is allowed, the communication from the electronic apparatus 100 to the power supply apparatus 300 is enabled. After the restriction of the communication from the electronic apparatus 100 to the power supply apparatus 300 has been released, the system control unit 304 proceeds to step S617.

In step S617, based on the result of the authentication communication in step S613, the system control unit 304 determines whether the cable 200 is conformed to the USB PD standard. For example, the power supply apparatus 300 has a storage unit in which a list including XIDs corresponding to cables is stored in advance. Next, the system control unit 304 verifies the XID acquired by the authentication communication in step S613 against the list. When the XID acquired by the authentication communication is indicated in the list, the system control unit 304 determines that the cable 200 is conformed to the USB PD standard. When the XID acquired by the authentication communication is not indicated in the list, the system control unit 304 determines that the cable 200 is not conformed to the USB PD standard. If the system control unit 304 determines that the cable 200 is complaint with the USB PD standard, the system control unit 304 proceeds to step S618. If the system control unit 304 determines that the cable 200 is not complaint with the USB PD standard, the system control unit 304 proceeds to step S620. When the system control unit 304 determines that the cable 200 is complaint with the USB PD standard, the system control unit 304 controls the communication unit 306 to perform PD communication with the cable 200 and acquire characteristic information about the cable 200 from the cable 200.

In step S618, the system control unit 304 determines a first power supply capability to notify the electronic apparatus 100 of at least one type of power that can be supplied from the power supply apparatus 300 to the electronic apparatus 100. Next, the system control urtit 304 controls the communication unit 306 to transmit power supply capability information indicating the first power supply capability to the electronic apparatus 100. For example, the system control unit 304 transmits a source capability message in which the power supply capability information is stored. FIG. 7C is a diagram for describing an example of the first power supply capability. For example, the first power supply capability is determined based on the characteristic information about the cable 200 and includes at least one type of power allowed by the cable 200. In the example illustrate in FIG. 7C, the maximum current (3 A) included in the first power supply capability is the same as the upper limit for example, 3 A) of the current allowed by the cable 200. Furthermore, in the example illustrated in FIG. 7C. the maximum voltage (20 V) included in the first power supply capability is the same as the upper limit (for example, 20 V) of the voltage allowed by the cable 200. The electronic apparatus 100 selects power B from at least one type of power included in the first power supply capability and requests the power supply apparatus 300 to supply the selected power B. Next, in response to the request from the electronic apparatus 100, the power supply apparatus 300 changes the power to supply to the electronic apparatus 100 from the power A to the power B. For example, the system control unit 304 controls the power control unit 303 and the output control unit 305 to change the power to supply to the electronic apparatus 100 from the power A to the power B.

In step S620, the system control unit 304 determines a second power supply capability to notify the electronic apparatus 100 of at least one type of power that can be supplied from the power supply apparatus 300 to the electronic apparatus 100. Next, the system control unit 304 controls the communication unit 306 to transmit power supply capability information indicating the second power supply capability to the electronic apparatus 100. For example, the system control unit 304 transmits a source capability message in which the power supply capability information is stored. FIG. 7D is a diagram for describing an example of the second power supply capability. In the example illustrated in FIG. 7D, the maximum power (9.9 W) included in the second power supply capability is lower than the maximum power (60 W) included in the first power supply capability. In the example illustrated in FIG. 7D, the maximum current (2 A) included in the second power supply capability is lower than the upper limit (for example, 3 A) of the current allowed by the cable 200. Furthermore, in the example illustrated in FIG. 7D, the maximum voltage (9 V) included in the second power supply capability is lower than the upper limit (for example, 20 V) of the voltage allowed by the cable 200. The electronic apparatus 100 selects power B from at least one type of power included in the second power supply capability and requests the power supply apparatus 300 to supply the selected power B. Next, in response to the request from the electronic apparatus 100, the power supply apparatus 300 changes the power to supply to the electronic apparatus 100 from the power A to the power B. For example, the system control unit 304 controls the power control unit 303 and the output control unit 305 to change the power to supply to the electronic apparatus 100 from the power A to the power B.

As described above, according to the first embodiment, the power supply apparatus 300 does not accept the request from the electronic apparatus 100 until the authentication communication with the cable 200 is completed. In this way, the power supply apparatus 300 can give a higher priority to the authentication communication than to the response to the request from the electronic apparatus 100 so that the authentication communication can be performed in a short time. Consequently, the power supply apparatus 300 can quickly start the processes based on the result of the authentication communication and select the first power supply capability or the second power supply capability in a short time.

In the above example, the electronic apparatus 100 is connected to the power supply apparatus 300 via the cable 200, and the power supply apparatus 300 does not accept the request from the electronic apparatus 100 until the authentication communication with the cable 200 is completed. However, another configuration is also possible. For example, after the electronic apparatus 100 is connected to the power supply apparatus 300, the power supply apparatus 300 may perform the authentication communication with the electronic apparatus 100, and until the authentication communication with the electronic apparatus 100 is completed, the power supply apparatus 300 may not accept the request from the electronic apparatus 100. In this case, the electronic apparatus 100 may be connected to the power supply apparatus 300 by wireless communication or the like without using the cable 200.

[Second Embodiment] A personal computer, a microcomputer, a central processing unit (CPU), or a microprocessor can also realize the various functions, the various processes, or the various methods explained in the first embodiment by executing a computer program. In the following explanation, in a second embodiment, the personal computer, the microcomputer, the CPU, or the microprocessor is referred to as "computer X". In the second embodiment, a computer program for controlling the computer X and for realizing the various functions, the various processes, or the various methods explained in the first embodiment is referred to as "computer program".

The various functions, the various processes, or the various methods explained in the first embodiment are realized by the computer X executing the computer program Y. In this case, the computer program Y is supplied to the computer X via a computer-readable storage medium. The computer-readable storage medium in the second embodiment includes at least one of a hard disk apparatus, a magnetic storage apparatus, an optical storage apparatus, a photomagnetic storage apparatus, a memory card, a volatile memory, a non-volatile memory, or the like. The computer-readable storage medium in the second embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

This application claims the benefit of Japanese Patent Application No. 2020-171963, filed Oct. 12, 2020, which is hereby incorporated by reference herein in its entirety.

What is claimed is:

1. A power supply apparatus comprising:
at least one processor which executes a program stored in a memory and causes the power supply apparatus to function as:
a communication unit; and
a control unit that controls the communication unit so as to perform authentication communication with a cable after the cable is connected to the power supply apparatus, and controls the communication unit so as not to accept a request from an external apparatus connected to the cable in a period until the authentication communication with the cable is completed;
wherein the control unit controls the communication unit to transmit power supply capability information about power supply capability of the power supply apparatus to the external apparatus via the cable after the authentication communication with the cable is completed; and
wherein the control unit selects one of a plurality of power supply capability including a first power supply capability and a second power supply capability based on the authentication communication and controls the communication unit to transmit the power supply capability information indicating the selected power supply capability to the external apparatus.

2. The power supply apparatus according to claim 1, further comprising; an interface circuit, wherein the communication unit communicates with the external apparatus via the interface circuit,
wherein the control unit controls the communication unit so as to change a voltage level of the interface circuit to a voltage level indicating that communication from the external apparatus to the power supply apparatus is restricted, in the period until the authentication communication with the cable is completed.

3. The power supply apparatus according to claim 1, wherein the control unit controls the communication unit so as to return a response indicating a rejection of the request as a response to the request, in the period until the authentication communication with the cable is completed.

4. The power supply apparatus according to claim 1, wherein the control unit controls the communication unit so as to return a response instructing standby as a response to the request, in the period until the authentication communication with the cable is completed.

5. The power supply apparatus according to claim 1, wherein the authentication communication is communication conforming to USB Type-C Authentication.

6. The power supply apparatus according to claim 1, wherein the control unit switches connection between the power supply apparatus and the external apparatus to connection conforming to USB Type-C, in a case where the authentication communication with the cable fails to be completed.

7. The power supply apparatus according to claim 1, wherein the control unit (a) determines whether the cable is conformed to USB PD (Power Delivery) based on a result of the authentication communication, (b) controls the communication unit to transmit the power supply capability information indicating the first power supply capability to the external apparatus in a case where the control unit determines that the cable is conformed to the USB PD, and (c) controls the communication unit to transmit the power supply capability information indicating the second power supply capability lower than the first power supply capability to the external apparatus in a case where the control unit determines that the cable is not conformed to the USB PD.

8. The power supply apparatus according to claim 1, wherein the at least one processor further causes the power supply apparatus to function as:
an output unit that supplies power to the external apparatus via the cable in case where the cable is connected to the power supply apparatus and the external apparatus is connected to the cable.

9. A method comprising:
performing authentication communication with a cable connected to a power supply apparatus via a communication unit of the power supply apparatus after the cable is connected to the power supply apparatus;
controlling the communication unit so as not to accept a request from an external apparatus connected to the cable in a period until the authentication communication with the cable is completed;
controlling the communication unit to transmit power supply capability information about power supply capability of the power supply apparatus to the external apparatus via the cable after the authentication communication with the cable is completed; and
selecting one of a plurality of power supply capability including a first power supply capability and a second power supply capability based on the authentication communication and controlling the communication unit to transmit the power supply capability information indicating the selected power supply capability to the external apparatus.

10. The method according to claim 9, wherein the controlling controls the communication unit so as to return a response indicating a rejection of the request as a response to the request, in the period until the authentication communication with the cable is completed.

11. The method according to claim 9, wherein the controlling controls the communication unit so as to return a response instructing standby as a response to the request, in the period until the authentication communication with the cable is completed.

12. The method according to claim 9, wherein the authentication communication is communication conforming to USB Type-C Authentication.

13. The method according to claim 9, wherein the controlling switches connection between the power supply apparatus and the external apparatus to connection conforming to USB Type-C, in a case where the authentication communication with the cable fails to be completed.

14. The method according to claim 9, wherein the controlling (a) determines whether the cable is conformed to USB PD (Power Delivery) based on a result of the authentication communication, (b) controls the communication unit to transmit the power supply capability information indicating the first power supply capability to the external apparatus in a case where it is determined that the cable is conformed to the USB PD, and (c) controls the communication unit to transmit the power supply capability information indicating the second power supply capability lower than the first power supply capability to the external apparatus in a case where it is determined that the cable is not conformed to the USB PD.

15. A non-transitory storage medium that stores a program for causing a computer to execute a method, the method comprising:
performing authentication communication with a cable connected to a power supply apparatus via a communication unit of the power supply apparatus after the cable is connected to the power supply apparatus; and
controlling the communication unit so as not to accept a request from an external apparatus connected to the cable in a period until the authentication communication with the cable is completed;
controlling the communication unit to transmit power supply capability information about power supply capability of the power supply apparatus to the external apparatus via the cable after the authentication communication with the cable is completed; and
selecting one of a plurality of power supply capability including a first power supply capability and a second power supply capability based on the authentication communication and controlling the communication unit to transmit the power supply capability information indicating the selected power supply capability to the external apparatus.

* * * * *